(12) United States Patent
Gredat et al.

(10) Patent No.: US 9,962,566 B2
(45) Date of Patent: May 8, 2018

(54) RESPIRATORY EQUIPMENT FOR AIRCRAFT WITH AN INFLATABLE HARNESS

(75) Inventors: Simon Gredat, Versailles (FR); Patrick Grospretre, Montfort l'Amaury (FR); Guillaume Schmidt, Suresnes (FR)

(73) Assignee: Zodiac Aerotechnics, Plaisir (FR)

( * ) Notice: Subject to any disclaimer, the term of this patent is extended or adjusted under 35 U.S.C. 154(b) by 254 days.

(21) Appl. No.: 13/883,578

(22) PCT Filed: Jun. 22, 2011

(86) PCT No.: PCT/IB2011/001768
§ 371 (c)(1),
(2), (4) Date: May 6, 2013

(87) PCT Pub. No.: WO2012/066394
PCT Pub. Date: May 24, 2012

(65) Prior Publication Data
US 2013/0220329 A1 Aug. 29, 2013

Related U.S. Application Data

(60) Provisional application No. 61/413,531, filed on Nov. 15, 2010.

(51) Int. Cl.
*A62B 18/08* (2006.01)
*A62B 25/00* (2006.01)
(Continued)

(52) U.S. Cl.
CPC ............ *A62B 18/084* (2013.01); *A62B 25/00* (2013.01); *B64D 10/00* (2013.01); *A62B 7/02* (2013.01); *A62B 18/02* (2013.01); *A62B 25/005* (2013.01)

(58) Field of Classification Search
CPC ........... A62B 7/02; A62B 18/02; A62B 18/08; A62B 18/084; A62B 25/00; A62B 25/005;
(Continued)

(56) References Cited

U.S. PATENT DOCUMENTS 3,379,195 A 4/1968 Bleach
4,909,247 A * 3/1990 Terrisse et al. .......... 128/206.27
(Continued)

FOREIGN PATENT DOCUMENTS

CN 1300228 A 6/2001
CN 1514742 A 7/2004
(Continued)

OTHER PUBLICATIONS

International Search Report and Written Opinion dated May 21, 2012 in Application No. PCT/IB2011/001768.
(Continued)

*Primary Examiner* — Todd J Scherbel
*Assistant Examiner* — Elliot S Ruddie
(74) *Attorney, Agent, or Firm* — Kilpatrick Townsend & Stockton LLP; Dean W. Russell

(57) ABSTRACT

A respiratory equipment (1) comprising: a respiratory mask (10) adapted to be applied in a use position around a nose and a mouth to a user, an inflatable harness (20), a gas supply tube (2) connected to the respiratory mask at a downstream end (2b), a storage element (30) comprising a housing (32) adapted to store the respiratory mask (10) in a storage position, and a retaining device (40) including a leash (46) and a releasably holding portion (42, 44) connected to the leash (46), the leash having a connecting portion (47) connected to the harness (20) and a securing portion (45) connected to the storage element (30).

16 Claims, 8 Drawing Sheets

(51) Int. Cl.
*A62B 18/00* (2006.01)
*B64D 10/00* (2006.01)
*A62B 7/02* (2006.01)
*A62B 18/02* (2006.01)

(58) Field of Classification Search
CPC .. B64D 10/00; B64D 11/00; B64D 2231/025; B64D 2231/00; B64D 2231/02; B64D 11/0629
USPC ............ 128/204.29, 205.25, 206.21, 206.27; 206/485
See application file for complete search history.

(56) References Cited

U.S. PATENT DOCUMENTS

| | | | |
|---|---|---|---|
| 5,623,923 | A | 4/1997 | Bertheau et al. |
| 5,954,052 | A * | 9/1999 | McDonald et al. ..... 128/206.27 |
| 5,957,132 | A | 9/1999 | McDonald et al. |
| 6,089,230 | A | 7/2000 | Barker et al. |
| 6,470,887 | B1 | 10/2002 | Martinez |
| 2002/0157668 | A1 * | 10/2002 | Bardel ..................... 128/201.22 |
| 2002/0189617 | A1 | 12/2002 | Cordero et al. |
| 2004/0144384 | A1 | 7/2004 | Martinez et al. |
| 2009/0145436 | A1 | 6/2009 | Aubonnet |
| 2010/0126511 | A1 | 5/2010 | Greter |

FOREIGN PATENT DOCUMENTS

| | | |
|---|---|---|
| CN | 101426556 A | 5/2009 |
| CN | 101500657 A | 8/2009 |
| WO | 199958197 A1 | 11/1999 |
| WO | 2008017630 A1 | 2/2008 |
| WO | WO 2008087468 A1 * | 7/2008 |
| WO | 2009115868 A1 | 9/2009 |

OTHER PUBLICATIONS

Chinese Patent Application No. 201180058371.X, Examination and Search Report dated Oct. 29, 2014, partial English translation included.

* cited by examiner

RESPIRATORY EQUIPMENT FOR AIRCRAFT WITH AN INFLATABLE HARNESS

CROSS-REFERENCE TO RELATED APPLICATIONS

This application is the U.S. national phase of International Application No. PCT/IB2011/001768 filed on Jun. 22, 2011, and published in English by the World Intellectual Property Organization on May 24, 2012 as International Publication No. WO 2012/066394 A2, which application claims the benefit of U.S. Provisional Application No. 61/413,531 filed on Nov. 15, 2010, the entire contents of both of which are incorporated herein by reference.

FIELD OF THE INVENTION

The invention relates to a respiratory equipment for aircraft including a respiratory mask and an inflatable harness to maintain the respiratory mask on the head of a user.

BACKGROUND OF THE INVENTION

In particular, the invention deals with a respiratory equipment comprising:
- a respiratory mask adapted to be applied in a use position around a nose and a mouth to a user,
- an inflatable harness to be connected to a source of pressurised gas and adapted to maintain the respiratory mask on the user,
- a gas supply tube connected to the respiratory mask at a downstream end for supplying the respiratory mask with breathable gas,
- a storage element (box or cup) comprising a housing adapted to store the respiratory mask in a storage position, the respiratory mask being away from the storage element in the use position.

The respiratory mask typically worn by aircraft crewmembers must be attached surely and rapidly on the crewmember head. And it must require only one hand to be attached; since the user's other hand is frequently required for some other essential tasks.

For example, if because of a pressurization failure, the pilot of an aircraft is required to rapidly don his respiratory mask to provide him with the necessary oxygen for breathing, he often must do so with one hand while his other hand is occupied in controlling the aircraft. Thus, the use of an inflatable head harness has been suggested in order to enable the respiratory mask to be donned using only one hand. Generally, the head harness has substantially a dome shape or an annular shape and is expanded diametrically by the introduction of pressurized gas to cause the harness to increase in size so that it can be positioned over the head of the user. The gas flow is controlled by a valve attached to the respiratory mask, and, after enlargement, the respiratory mask is placed in position over the nose and mouth, with the head harness extended over and spaced from the back of the head. Once the respiratory mask is properly positioned, the pressure in the head harness is released, causing the harness to contract and to contact the head of the pilot, whereby the respiratory mask is securely held in its proper position. Meanwhile, the pilot's other hand is free to control the aircraft or to perform such other tasks as may be required.

SUMMARY OF THE INVENTION

The invention aims at improving the efficiency of the respiratory mask donning and in particular reducing the time of inflation of the inflatable harness.

For this purpose, according to the invention the respiratory equipment further comprises a retaining device, the retaining device includes a leash (lanyard) and a releasably holding portion connected to the leash, the leash having a connecting portion connected to a retained portion of the harness and a securing portion connected to a securing element secured to the storage element in the storage position; said retaining device releasably retaining the harness relative to the storage element in order to pull on the harness (towards the storage element) and then automatically releasing the harness when the respiratory mask is moved from the storage position to the use position.

Therefore, the harness is mechanically unfolded thanks to the retaining device and, in the same time or successively, the harness is inflated by pressurised gas. It appeared that such a mechanical unfolding reduces the time for inflating the harness with the pressurised gas. Moreover, since the retaining device is released in the use position, the retaining device can be tuned to cause low disturbance in the donning and in the use of the mask.

According to another feature in accordance with the invention, preferably the connecting portion of the leash is connected to the retained portion of the harness through the releasably holding portion.

Therefore, the leash is released from the breathing mask in use position. So, the leash does not disturb the user in use of the respiratory mask.

According to a supplementary feature in accordance with the invention, preferably the releasably holding portion is releasably connected to the retained portion of the harness in the storage position and is automatically released from the harness in the use position of the respiratory mask.

Therefore, the releasably holding portion is also released from the breathing mask in use position. So, the I releasably holding portion does not disturb the user in use of the respiratory mask.

According to another supplementary feature in accordance with the invention, preferably the harness has an inflatable tube and a non-inflatable spacer connected to the inflatable tube, and the releasably holding portion is releasably retained (directly) to the non-inflatable spacer, the retained portion of the harness being part of the non-inflatable spacer.

Therefore, the release of the releasably holding portion from the harness is better controlled.

According to another supplementary feature in accordance with the invention, preferably the non-inflatable spacer is resiliently deformable.

Therefore, the non-inflatable spacer is more easily and stronger connected to the releasably holding portion.

According to a supplementary feature in accordance with the invention, preferably the harness comprises two inflatable tubes, each inflatable tube has to two ends connected to the respiratory mask and forms a harness loop (intended to surround the head of the user in use position, and the spacer has two ends respectively connected to said two inflatable tubes away from the ends of said inflatable tubes.

Therefore the time for inflating the harness with the pressurised gas is further reduced.

In accordance with the invention, preferably the respiratory equipment further has the following features:
- the gas supply tube is flexible and extends between an upstream end and the downstream end,
- the releasably holding portion is connected to the gas supply tube at an intermediate position away from the first and second ends of said gas supply tube, and the gas supply tube constitutes the leash between the first end and the intermediate position.

This solution is simple, efficient and does not require a separate leash, so that it requires fewer elements.

In advantageous embodiments, the breathing assembly preferably further has one or more of the following features:
the releasably holding portion has a retaining hole receiving the retained portion of the harness in the storage position and the releasably holding portion further has a restricted opening for inserting the retained portion of the harness in the retaining hole, said restricted opening having a width narrower than the width of the harness portion.
the releasably holding portion is resiliently deformable,
the releasably holding portion has an "Ω" shape in cross section,
the retaining device comprises two releasably holding portions releasably connected to two retained portions of the harness in the storage position,
the harness is connected to the gas supply tube through a valve for selectively inflating and deflating the harness,
the respiratory equipment is a full face mask, further comprising an eye protective shield adapted to be applied around user's eyes.

BRIEF DESCRIPTION OF THE DRAWINGS

Other features and advantages of the present invention will appear in the following detailed description, with reference to the appended drawings in which.

DETAILED DESCRIPTION OF THE INVENTION

Figure 1:
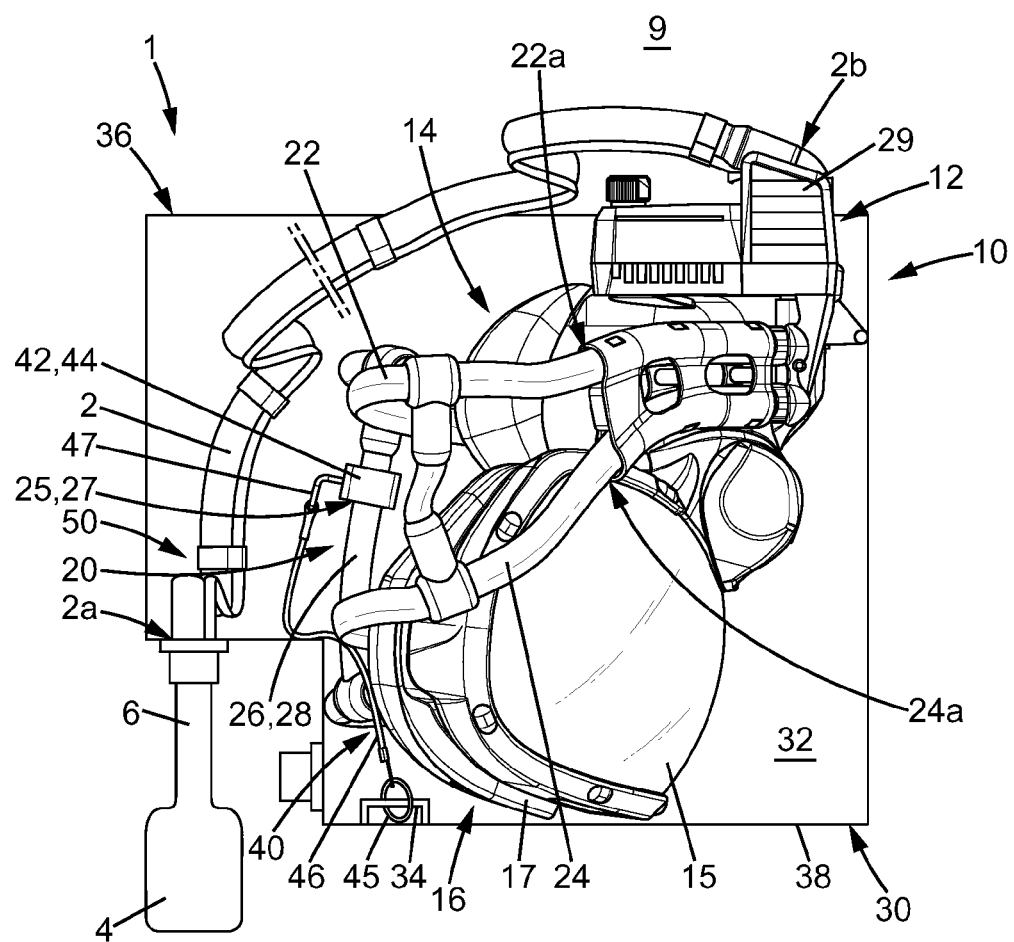
FIG. 1 illustrates a respiratory equipment in accordance with the invention in a storage position.

FIG. 1 to FIG. 5 illustrate a respiratory equipment 1 placed in a cabin 9 of an aircraft and essentially comprising a respiratory mask 10, an inflatable harness 20, a gas supply tube 2, a storage element 30 and a retaining device 40.

The respiratory mask 10 is a full face mask and includes an oronasal face piece 14, a rigid housing supporting the oronasal face piece 14 and forming an on-demand regulator 12 and an eye protective shield 16 fixed to the oronasal face piece 14. As shown in particular in FIGS. 1. and 5, the eye protective shield 16 includes a transparent lens 18 and a peripheral flange 17 to be sealingly applied on the face of a user 8. The oronasal face piece 14 is sealingly applied around the nose and the mouth of the user 8 in a use position.

The storage element 30 has an internal housing 32 delimited by a back 38 and being in communication with ambient air of the cabin 9 by an opening 36 at the opposite of the back 38. The storage element further comprises an anchoring element 34 secured to the back 38 of the storage element 30. In a storage position, the respiratory mask 10 is stored in the housing 32, as shown in FIG. 1. In the embodiment illustrated the storage element is a storage box having at least one door, preferably two doors hinged between an open position and closed position, to selectively close the opening 36. Preferably, the doors include a notch through which extends the demand regulator 12 in the storage position, so that the user may grasp the respiratory mask 10 without opening the doors. In an alternative embodiment the storage element may be replaced by a storage cup deprived of door. In the embodiment illustrated the back 38 has an optional offset and the anchoring element is a plastic clamp used to hold wires.

The gas supply tube 2 is flexible and comprises an upstream end 2a and a downstream end 2b. The gas supply tube 2 is connected at the upstream end 2a to a source of pressurised respiratory gas 4 (in particular oxygen) through a supply line 6. In the embodiment illustrated the upstream end 2a of the gas supply tube 2 is connected to the supply line 6 by a connector secured to the back 38 of the storage element 30. The downstream end 2b of the gas supply tube 2 is connected to the regulator 12, so that the oronasal face piece 14 is supplied in respiratory gas through the on-demand regulator 12.

Figure 5:
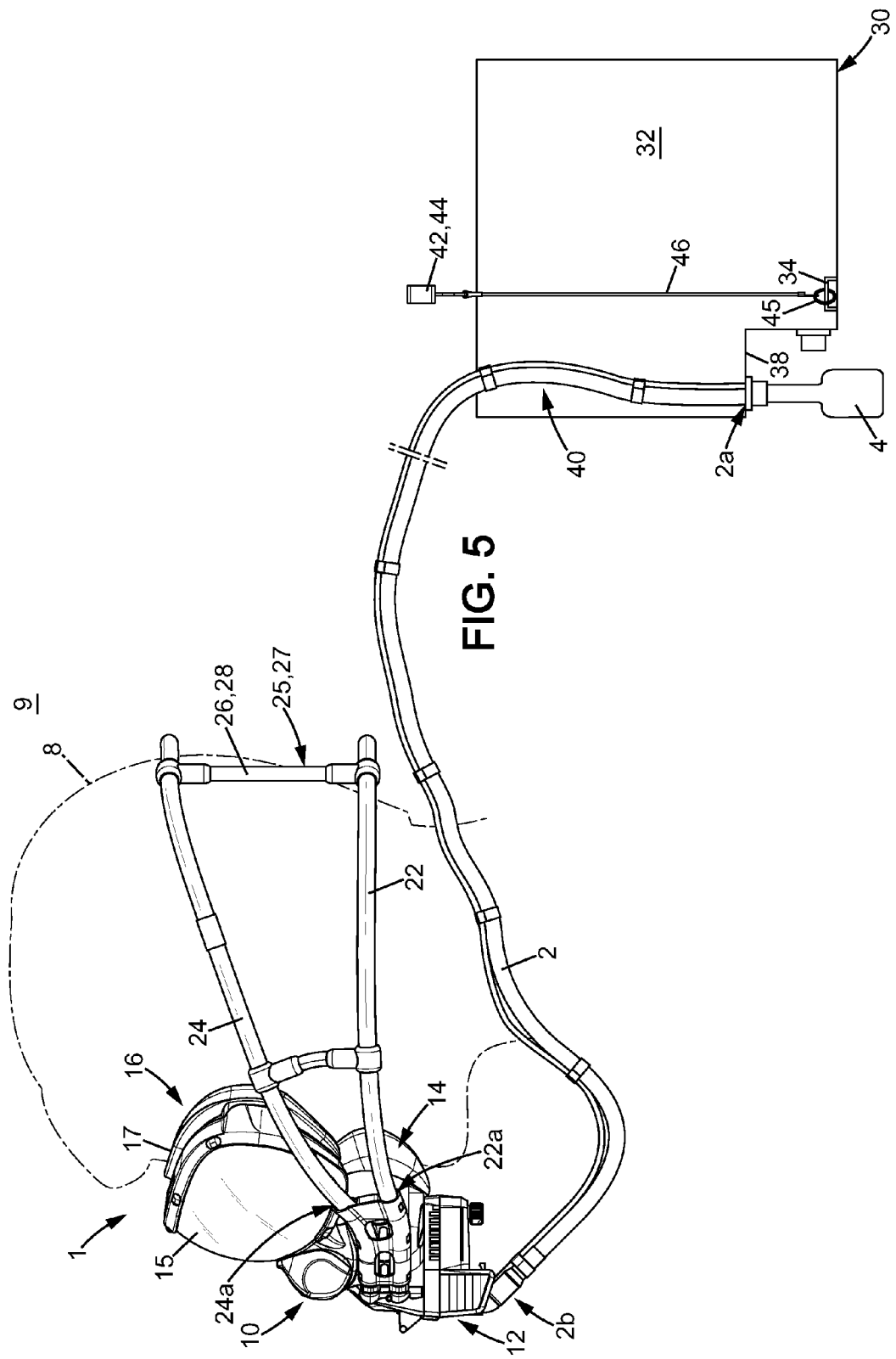
FIG. 5 illustrates the respiratory equipment in a use position.

The harness 20 comprises a lower inflatable tube 22 and an upper inflatable tube 24, each forming a loop having a first end 22a, 24a and a second end 22b, 24b connected to the regulator 12. As shown in FIG. 5, in the use position each of the lower inflatable tube 22 and the upper inflatable tube 24 surrounds the head of the user. The regulator 12 comprises a valve to selectively connect an internal chamber of the inflatable tubes 22, 24 with a source of pressurised gas for inflating the harness 20 and to the ambient air of the cabin 9 for deflating the harness 20 upon actuation of a lever 29. In the embodiment illustrated, the source of pressurised gas supplying the inflatable tubes 22, 24 is the source of respiratory gas 4 as described for example in WO99/58197. In an alternative embodiment, the inflatable tubes 22, 24 may be supplied in pressurised gas by an autonomous source of pressurised gas as described for example in WO2008/017630.

The harness 20 further comprises non-inflated elements forming spacers 26, 28, each connected at a lower end to the lower inflatable tube 22, away from the first 22a and second 22b ends of the lower inflatable tube 22, and at an upper end to the upper inflatable tube 24, away from the first 24a and second 24b ends of the upper inflatable tube 24. The spacers 26, 28 are in resilient material, such as rubber or elastomeric material. Preferably, the spacers 26, 28 have a tubular shape of circular section cross section.

The retaining device comprises a leash 46 and two releasably holding portions 42, 44 forming two releasably clamping elements. The leash 46 is flexible and comprises a securing end portion 45 and a connecting end portion 47. The securing end portion 45 is a ring fixed to the back 38 of the storage element 38. The connecting end portion 47 is secured to both holding elements 42, 44.

In the storage position, each holding element 42, 44 is releasably clamped or clipped to a retained portion 25, 27 of each spacer 26, 28. As shown in particular in FIG. 4, each releasably holding portion 42, 44 has a substantially "Ω" shape in cross section, that is to say each releasably holding portion 42, 44 has in cross section substantially the shape of a portion of a circle greater than a half circle. So, each releasably holding portion 42, 44 has two branches defining between them a retaining hole 52, 54, said branches having free ends forming between them a restricted opening 51, 53 having a width W51. Each retaining hole 52, 54 receives the corresponding retained portion 25, 27 of the harness 20 in the storage position. Each restricted opening 51, 53 enables the insertion of the corresponding retained portion 25, 27 of the harness 20 in the corresponding retaining hole 52, 54. Each retained portion 25, 27 of the spacer 26, 28 has a diameter Φ25 substantially equal to the diameter of the retaining holes 52, 54 and greater than the width W51 of the restricted opening.

The releasably holding portions 42, 44 are preferably made in a resiliently deformable material, in particular in Lexan®500R. In embodiment illustrated, the diameter of the φ25 of the retained portions 25, 27 and the diameter of the retaining holes 52, 54 are advantageously close to 10 millimeter and the width W51 is preferably close to 7 millimeters. The length of the leash 46 between the securing portion 45 and the connecting portion 47 is lower than the length of the gas supply tube 2 between the upstream end 2a and the downstream end 2b, and preferably lower than 1,000 millimeters. Otherwise, the length of the leash 46 is preferably greater than 300, preferably substantially equal to 500 millimeters.

Before storing the respiratory mask 10, the securing portion 45 of the retaining device 40 is secured to the storage element 30. The holding portions 42, 44 formed by separate elements are clipped on the retained portions 25, 27 of the harness 20. Then, the harness 20 is folded and the respiratory mask 10 is inserted in the storage element 30. Each of the gas supply tube 2 and the leash 46 forms bends 50 in the storage element 30, as shown in FIG. 1.

In the embodiment illustrated, the back 38 of the storage element 30 is the bottom of the storage element 30 and the eye protective shield 16 of the respiratory mask 10 rests on the back 38 of the storage element 30 in the storage position.

Figure 2:
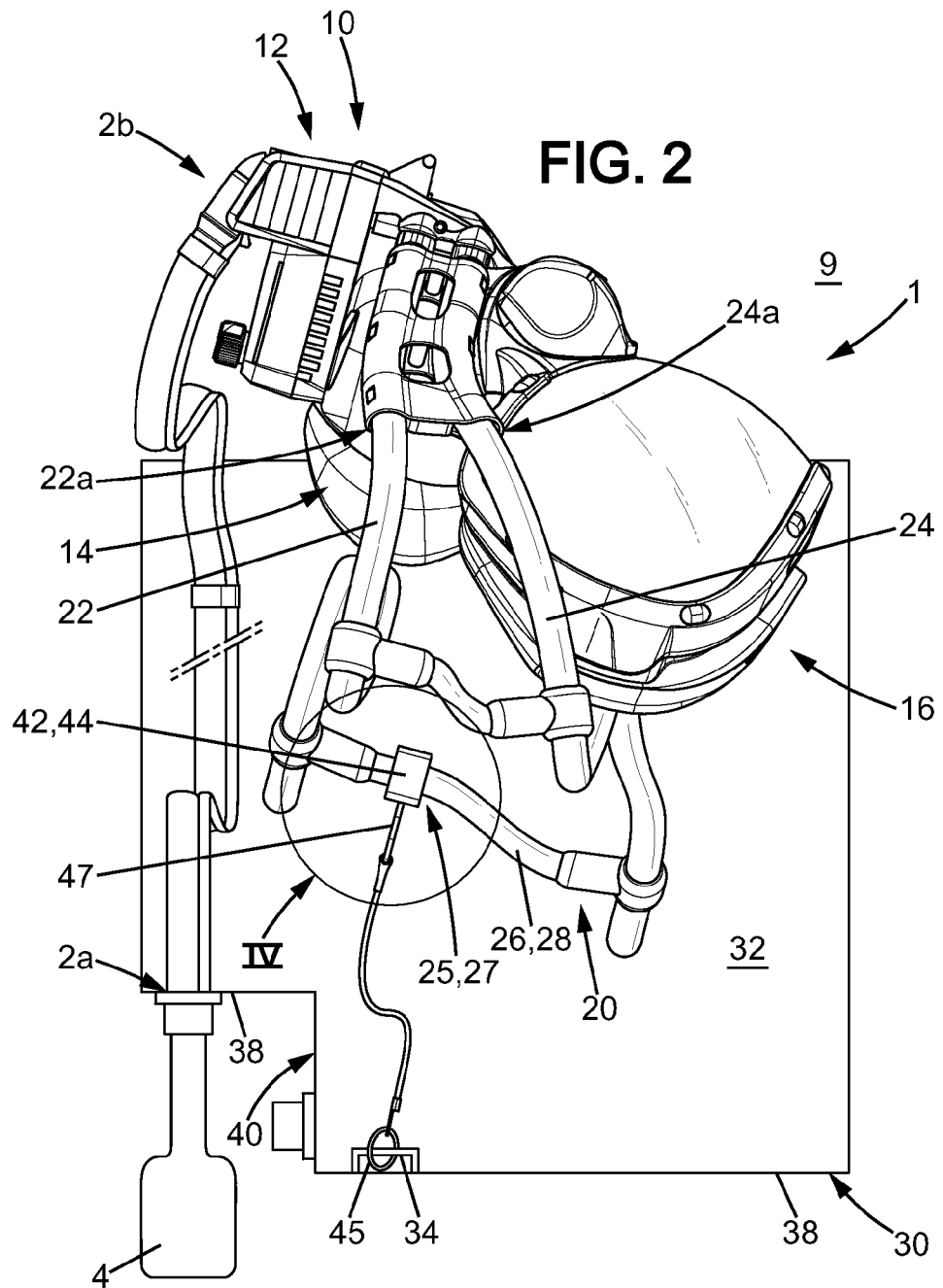
FIG. 2 illustrates the respiratory equipment in an intermediate position.

When required, the user 8 grasps the respiratory mask 10 by the supported portion formed by the housing of the regulator 12 and pull the respiratory mask 10 towards him through the opening 36. In the embodiment illustrated, the user rotates the respiratory mask 10 while pulling the respiratory mask 10 towards him as shown in FIG. 2. In a variant, the orientation of the respiratory mask 10 may be different in the storage element 30, in particular the harness preferably facing the back 38 of the storage element 30 when the back 38 of the storage element 30 is vertical, the user pulling therefore the respiratory mask 10 towards him without substantially rotating the respiratory mask 10.

Figure 3:
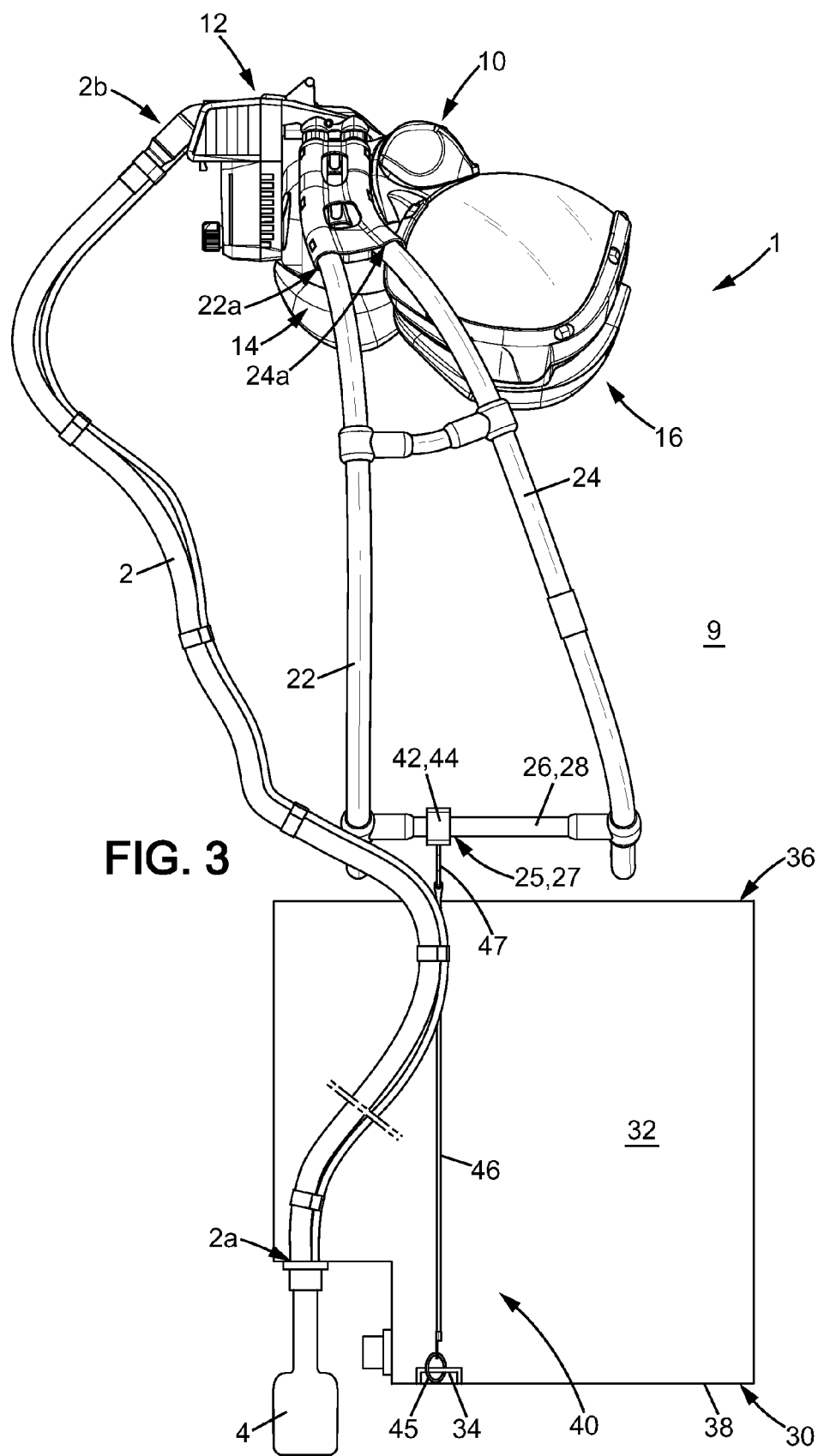
FIG. 3 illustrates the respiratory equipment in an releasing position.

As shown in FIGS. 2-3, the retaining device 40 extending between the harness 20 and the storage element 30 progressively exerts a retention force which deploys the harness 20 by pulling on the harness away from the oronasal face mask 14 and the eye protective shield 16.

Figure 4:
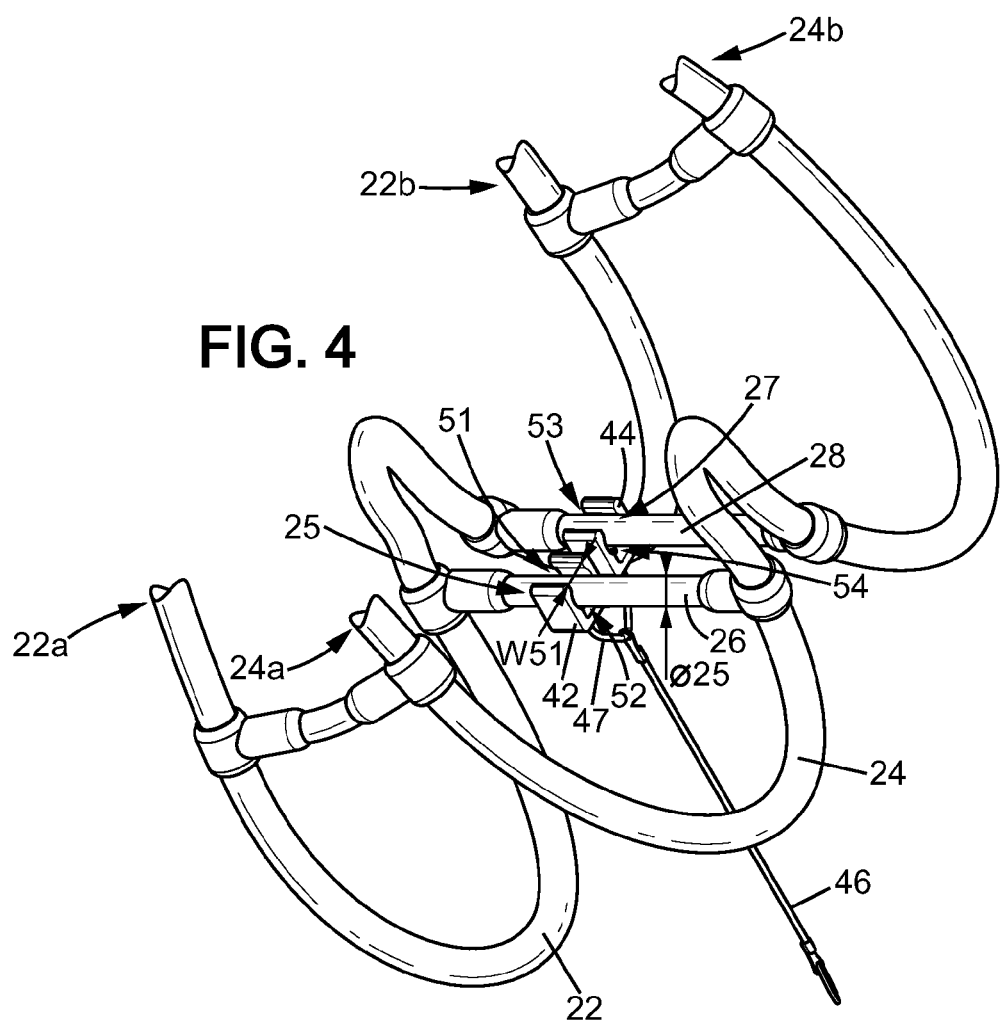
FIG. 4 illustrates at enlarged scale a portion referenced IV in FIG. 2.

As shown in FIGS. 3-4, in a releasing position the harness 20 faces the back 38 of the storage element 30 and the leash 46 is tight. So, the user 8 keeping on pulling the respiratory mask 10 towards his face, at the opposite of the storage element 30, the releasably holding portions 42, 44 of the retaining device 40 are released from the respiratory mask 10. The user 8 presses the lever 29 to inflate the harness 20 and then the user applies the respiratory mask 10 on his face, in a use position. In the use position, the whole retaining device 40 is release from the respiratory mask 10.

The retention force of the retaining device 40 in the releasing position corresponding to the release of the releasably holding portions 42, 44 from the retained portions 25, 27 is tuned so that it ensures good deployment, in particular in case a portion of the harness is jammed into the oronasal face piece 10 or the eye protective shield 16, but is sufficiently low to have no significant impact on the force exerted by the user 8 to pull the respiratory mask 10 towards him, and in particular on the movement of the respiratory mask 10.

Figure 6:
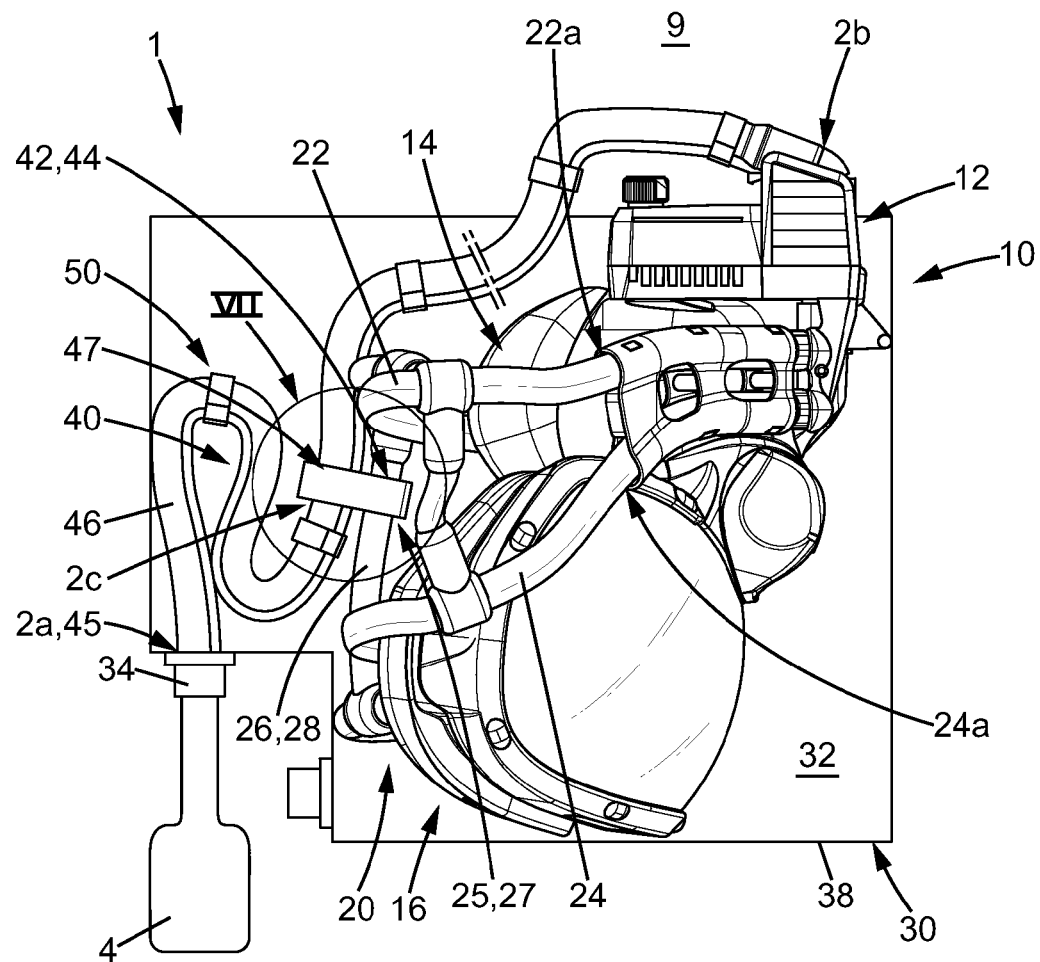
FIG. 6 illustrates a variant of respiratory equipment in accordance with the invention in the storage position.
Figure 7:
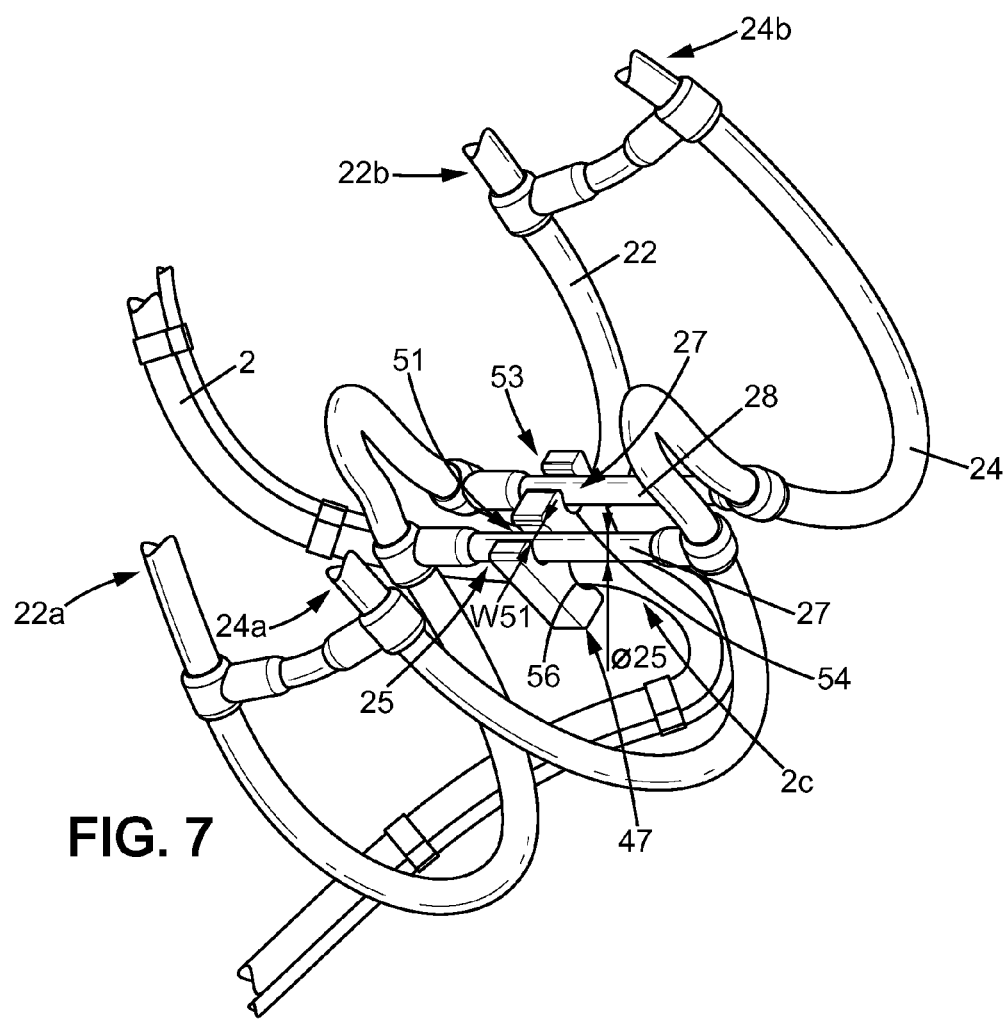
FIG. 7 illustrates at enlarged scale a portion referenced VII in FIG. 6.
Figure 8:
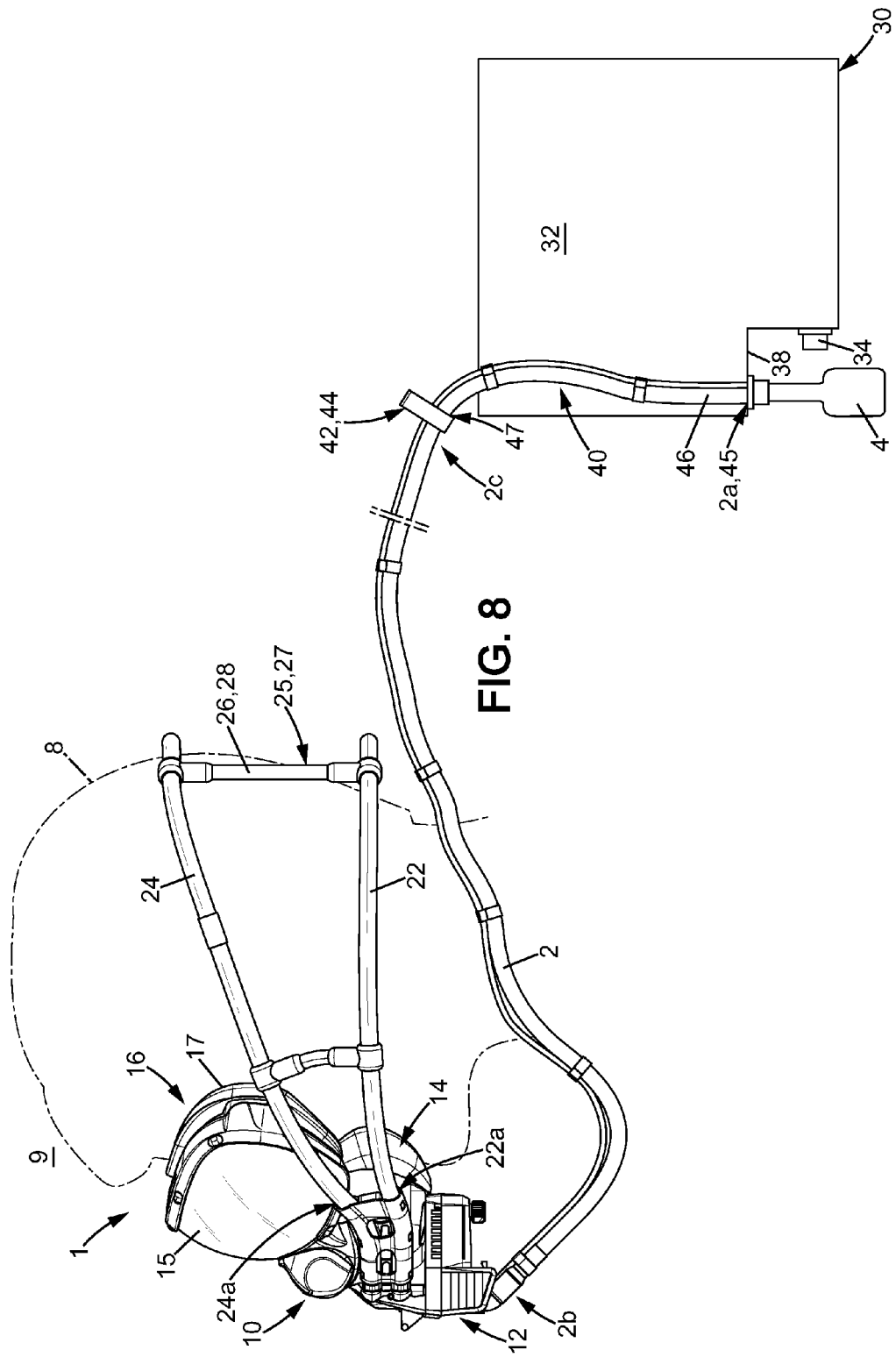
FIG. 8 illustrates the variant of respiratory equipment in the use position.

The embodiment shown in FIGS. 6-8 essentially differs from the embodiment shown in FIGS. 1-5 in that leash 46 is formed by a portion of the gas supply tube extending between the upstream end 2a and an intermediate position 2c between the upstream end 2a and the downstream end 2c.

The connecting portion 47 is formed by a plate in resiliently deformable material, the retaining holes 52, 54 and the restricted opening 51, 53 of the releasably holding portions 42, 44 being integral with said plate forming connecting portion 47. The plate of connecting portion 47 further comprises a fixing hole 56 through which the gas supply tube 2 extends. The gas supply tube 2 is tightly received in the intermediate position 2c in the fixing hole, so that the connecting portion 47 is fixed to the gas supply tube 2 in the intermediate position 2c.

The upstream end 2a of the gas supply tube 2 forms the securing portion 45 of the leash 46 and the connector secured to the back 38 forms the securing element 34 secured to the storage element 30.

As shown in FIG. 6, in the storage position the leash 46 has bends 50 forming at least one loop.

Of course the invention is not limited to the embodiments illustrated for illustrative and not limitative purpose. For example, in the first embodiment the leash 46 could be releasably connected to the securing element 34, so that the leash 46 is released from the storage element 30 in the use position.

The invention claimed is:

1. A respiratory equipment for aircraft comprising:
   a. a respiratory mask adapted to be applied in a use position around a nose and a mouth to a user,
   b. an inflatable harness to be connected to a source of pressurised gas, adapted to maintain the respiratory mask on the user, and comprising a retained portion,
   c. a gas supply tube connected to the respiratory mask at a downstream end for supplying the respiratory mask with breathable gas,
   d. a storage element comprising a housing adapted to store the respiratory mask in a storage position, the respiratory mask being away from the storage element in the use position,
   e. a securing element secured to the storage element, and
   f. a retaining device connecting the harness to the storage element and comprising a leash and at least one releasably holding element connected to the leash, the leash and the at least one releasably holding element cooperating to releasably connect the retained portion of the harness to the securing element.

2. The respiratory equipment according to claim 1 wherein a connecting portion of the leash is connected to the retained portion of the harness through the at least one releasably holding portion.

3. The respiratory equipment according to the claim 2 wherein the at least one releasably holding portion is releasably connected to the retained portion of the harness in the storage position and is automatically released from the harness in the use position of the respiratory mask.

4. The respiratory equipment according to claim 3 wherein:
   the harness has an inflatable tube and a non-inflatable spacer connected to the inflatable tube, and the at least one releasably holding portion is releasably retained to the non-inflatable spacer, the retained portion of the harness being part of the non-inflatable spacer.

5. The respiratory equipment according to claim 4 wherein the non-inflatable spacer is resiliently deformable.

6. The respiratory equipment according to claim 4 wherein:
the harness comprises two inflatable tubes,
each inflatable tube has two ends connected to the respiratory mask and forms a harness loop intended to surround the head of the user in use position, and
the spacer has two ends respectively connected to said two inflatable tubes away from the ends of said inflatable tubes.

7. The respiratory equipment according to claim 6 wherein:
the gas supply tube is flexible and extends between an upstream end and the downstream end,
the at least one releasably holding portion is connected to the gas supply tube at an intermediate position away from the first and second ends of said gas supply tube, and
the gas supply tube constitutes the leash between the first and the intermediate position.

8. A respiratory equipment for aircraft comprising:
a respiratory mask adapted to be applied in a use position around a nose and a mouth to a user,
an inflatable harness to be connected to a source of pressurised gas and adapted to maintain the respiratory mask on the user,
a gas supply tube connected to the respiratory mask at a downstream end for supplying the respiratory mask with breathable gas,
a storage element comprising a housing adapted to store the respiratory mask in a storage position, the respiratory mask being away from the storage element in the use position,
wherein the respiratory equipment further comprises a retaining device, the retaining device comprising a leash and at least one releasably holding portion connected to the leash, the leash having a connecting portion connected to a retained portion of the harness and a securing portion connected to a securing element secured to the storage element in the storage position, and
wherein the at least one releasably holding portion has a retaining hole receiving the retained portion of the harness in the storage position and the at least one releasably holding portion further has a restricted opening for inserting the retained portion of the harness in the retaining hole said restricted opening having a width narrower than the width of the retained portion.

9. The respiratory equipment according to claim 8 wherein the at least one releasably holding portion is resiliently deformable.

10. The respiratory equipment according to claim 9 wherein the at least one releasably holding portion has an "Ω" shape in cross section.

11. The respiratory equipment according to claim 1 wherein the retaining device comprises two releasably holding portions releasably connected to two retained portions of the harness in the storage position.

12. The respiratory equipment according to claim 1 wherein the harness is connected to the gas supply tube through a valve for selectively inflating and deflating the harness.

13. The respiratory equipment according to claim 1 further comprising an eye protective shield adapted to be applied around a user's eyes.

14. Respiratory equipment for use in aircraft, comprising:
a. a respiratory mask configured in use to be applied around a nose and a mouth of a user;
b. a harness configured in use (i) to be connected to a source of inflation gas and (ii) to maintain the respiratory mask around the nose and mouth of the user;
c. a gas supply tube connected to the respiratory mask and configured in use to supply breathable gas to the respiratory mask;
d. a storage element comprising (i) an anchoring element and (ii) a housing configured (A) to store the respiratory mask in a storage position and (B) to be away from the respiratory mask when the respiratory mask is in use by the user; and
e. means for connecting at least a portion of the harness to the anchoring element when the respiratory mask is in the storage position, such connecting means configured to release the harness from the anchoring element for use of the respiratory mask by the user.

15. The respiratory equipment according to claim 14 in which the connecting means comprises:
a. a flexible leash having first and second end portions;
b. means for securing the first end portion to the anchoring element; and
c. means for releasably connecting the second end portion to the harness.

16. The respiratory equipment according to claim 15 in which each of the gas supply tube and the flexible leash has a length, the length of the gas supply tube being greater than the length of the flexible leash.

* * * * *